US009600782B2

(12) United States Patent
Takusari et al.

(10) Patent No.: US 9,600,782 B2
(45) Date of Patent: Mar. 21, 2017

(54) MOBILE INFORMATION PROCESSING TERMINAL, SOCIAL NETWORKING SERVICE SYSTEM, SERVER, AND PROCESSING METHOD

(71) Applicant: YAHOO JAPAN CORPORATION, Tokyo (JP)

(72) Inventors: Tomohito Takusari, Tokyo (JP); Hiromoto One, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 418 days.

(21) Appl. No.: 14/149,163

(22) Filed: Jan. 7, 2014

(65) Prior Publication Data

US 2014/0195608 A1    Jul. 10, 2014

(30) Foreign Application Priority Data

Jan. 9, 2013 (JP) ................................. 2013-001508

(51) Int. Cl.
*G06F 15/173* (2006.01)
*G06Q 10/02* (2012.01)
(Continued)

(52) U.S. Cl.
CPC ........... *G06Q 10/025* (2013.01); *G06Q 50/01* (2013.01); *H04L 51/32* (2013.01)

(58) Field of Classification Search
None
See application file for complete search history.

(56) References Cited

U.S. PATENT DOCUMENTS

2009/0239467 A1* 9/2009 Gulin ................... G08B 5/36
455/41.2
2010/0082821 A1* 4/2010 Rosenblatt .............. G06F 15/16
709/228
(Continued)

FOREIGN PATENT DOCUMENTS

| JP | A-2003-44615 | 2/2003 |
| JP | A-2012-3635 | 1/2012 |
| JP | A-2012-108941 | 6/2012 |

OTHER PUBLICATIONS

Mangla, Karen. "Under the Hood: Building the Location API" Posted at <https://code.facebook.com/posts/609158225791856/under-the-hood-building-the-location-api/> on Mar. 9, 2012.*

(Continued)

*Primary Examiner* — Scott B Christensen
(74) *Attorney, Agent, or Firm* — Oliff PLC

(57) ABSTRACT

At a mobile information processing terminal, a close-range communication unit performs close-range communications with another mobile information processing terminal, a reception unit receives through the close-range communication unit a user identifier for uniquely identifying a user of an application for a social networking service (SNS) on the other mobile information processing terminal, a determination unit is configured to determine whether there is a match between the social networking service on the other mobile information processing terminal and an SNS used on the mobile information processing terminal, and when the determination unit determines that there is a match, the transmission unit transmits the received user identifier to a server of the SNS so as to register a user identified by the user identifier as a friend.

8 Claims, 5 Drawing Sheets

(51) Int. Cl.
    *G06Q 50/00*     (2012.01)
    *H04L 12/58*     (2006.01)

(56) References Cited

U.S. PATENT DOCUMENTS

| | | | | |
|---|---|---|---|---|
| 2010/0280904 A1* | 11/2010 | Ahuja | ................... | G06Q 30/02 |
| | | | | 705/14.58 |
| 2011/0276961 A1* | 11/2011 | Johansson | ................ | G06F 8/61 |
| | | | | 717/178 |
| 2013/0041775 A1* | 2/2013 | Rosenberg | ............ | G06Q 30/02 |
| | | | | 705/26.9 |

OTHER PUBLICATIONS

"Auto Accept Friend Requests". Posted at <https://premium.wpmudev.org/ . . . >. Jun. 5, 2012.*

Jun. 10, 2014 Office Action issued in Japanese Patent Application No. 2013-001508 (with translation).

* cited by examiner

MOBILE INFORMATION PROCESSING TERMINAL, SOCIAL NETWORKING SERVICE SYSTEM, SERVER, AND PROCESSING METHOD

CROSS-REFERENCE TO RELATED APPLICATIONS

The present application claims priority to and incorporates by reference the entire contents of Japanese Patent Application No. 2013-001508 filed in Japan on Jan. 9, 2013.

BACKGROUND OF THE INVENTION

1. Field of the Invention

The present invention relates to a process of friend registration in social networking services.

2. Description of the Related Art

In recent years, to promote and support connections between people, social networking services (abbreviated as SNSs) in the Internet have been utilized. These services are designed to provide places where each user can post and disclose his/her information (contents) such as articles and photographs to other users. In such services, each user can register persons who frequently exchange information with him/her as friends (also called my friend registration or the like) so that their diaries and the like can be automatically posted on his/her page.

As a related technique, for example, to provide a system in which users not limited to individuals can easily utilize an e-mail friend introduction service and retailers can offer introduction services to pull in more customers, Japanese Laid-open Patent Publication. No. 2003-044615 discloses a server computer exchanging data with mobile terminals via close-range wireless telecommunications. The technique disclosed in Japanese Laid-open Patent Publication No. 2003-044615 allows registration of a user's profile information, introduction of other registered users' profile information, registration of e-mail friend request information indicating a user who sends a request for e-mail exchange to another user and a user who is a target of the request, notification of the e-mail friend request to the registered target user, registration of e-mail friend approval information indicating a user who sends a request for e-mail exchange and a user approving the request, and notification of the e-mail friend approval to the registered request sender.

To build friendships with others in a social networking service, a user A files a friend request, and a user B receiving the friend request gives an approval. The processes of sending a friend request and giving an approval are performed through a server which manages user IDs.

Each user files a friend request to another user whom he/she wishes to be a friend after searching for the user's name, ID, attributes, and the like. However, the user may feel that the foregoing searching operation is tedious if a friend of the user is actually nearby, for example, and the user still needs to perform the whole searching operation.

In recent years' social networking services, each user can easily search for a friend who is in the vicinity based on the location of a mobile information processing terminal. However, when filing a friend request using the location of a mobile information processing terminal, the location acquired by a GPS (global positioning system) may be erroneous or it may take time to search for a desired user in a place with many people or the like.

SUMMARY OF THE INVENTION

It is an object of the present invention to at least partially solve the problems in the conventional technology.

According to one aspect of an embodiment, a mobile information processing terminal includes: a close-range communication unit that performs close-range communications with other mobile information processing terminal; a reception unit that receives through the close-range communication unit a user identifier for uniquely identifying a user of an application for a social networking service on the other mobile information processing terminal; a determination unit configured to determine whether there is a match between the social networking service on the other mobile information processing terminal and a social networking service on the mobile information processing terminal; and a transmission unit that, when the determination unit determines that there is a match, transmits the received user identifier to a server of the social networking service so as to register a user identified by the user identifier as a friend.

According to another aspect of an embodiment, a server includes: a reception unit that receives a user identifier of a user to be registered as a friend transmitted from a mobile information processing terminal as described above; and a registration unit that registers the user identified by the user identifier received by the reception unit as a friend of a user of the mobile information processing terminal.

According to still another aspect of an embodiment, a processing method performed by a server includes a reception unit and a registration unit, and the method includes: receiving, by the reception unit, a user identifier of a user to be registered as a friend transmitted from the mobile information processing terminal as described above, and registering, by the registration unit, the user identified by the user identifier received in the receiving as a friend of a user of the mobile information processing terminal.

According to still another aspect of an embodiment, a computer readable storage medium having stored therein a program for allowing a computer to function as: a reception unit that receives a user identifier of a user to be registered transmitted from a mobile information processing terminal as described above; and a registration unit that registers the user identified by the user identifier received by the reception unit as a friend of a user of the mobile information processing terminal.

According to still another aspect of an embodiment, a social networking service system includes a mobile information processing terminal and a server are communicably connected with each other. The mobile information processing terminal includes: a close-range communication unit that performs close-range communications with other mobile information processing terminal; a reception unit that receives through the close-range communication unit a user identifier for uniquely identifying a user of an application for a social networking service on the other mobile information processing terminal; a determination unit configured to determine whether there is a match between the social networking service on the other mobile information processing terminal and a social networking service on the mobile information processing terminal; and a transmission unit that, when the determination unit determines that there is a match, transmits the received user identifier to a server of the social networking service so as to register a user identified by the user identifier as a friend. The server includes: a reception unit that receives the user identifier of the user to be registered as a friend transmitted from the mobile information processing terminal; and a registration unit that registers the user identified by the user identifier as a friend of a user of the mobile information processing terminal.

According to still another aspect of an embodiment, a processing method is performed by a mobile information processing terminal including a close-range communication unit that performs close-range communications with other mobile information processing terminal, a reception unit, a determination unit, and a transmission unit. The method includes: receiving, by the reception unit and through the close-range communication unit, a user identifier for uniquely identifying a user of an application for a social networking service on the other mobile information processing terminal; determining, by the determination unit, whether there is a match between the social networking service on the other mobile information processing terminal and a social networking service on the mobile information processing terminal; and transmitting, by the transmission unit, when the determination unit determines that there is a match, the received user identifier to a server of the social networking service so as to register the user identified by the user identifier as a friend.

According to still another aspect of an embodiment, a computer readable storage medium having stored therein a program for allowing a computer to function as: a close-range communication unit that performs close-range communications with other mobile information processing terminal; a reception unit that receives through the close-range communication unit a user identifier for uniquely identifying a user of an application for a social networking service on the other mobile information processing terminal; a determination unit configured to determine whether there is a match between the social networking service on the other mobile information processing terminal and a social networking service on the mobile information processing terminal; and a transmission unit that, when the determination unit determines that there is a match, transmits the received user identifier to a server of the social networking service so as to register a user identified by the user identifier as a friend.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment for realizing the present invention will be described below with reference to the drawings.

Figure 1:
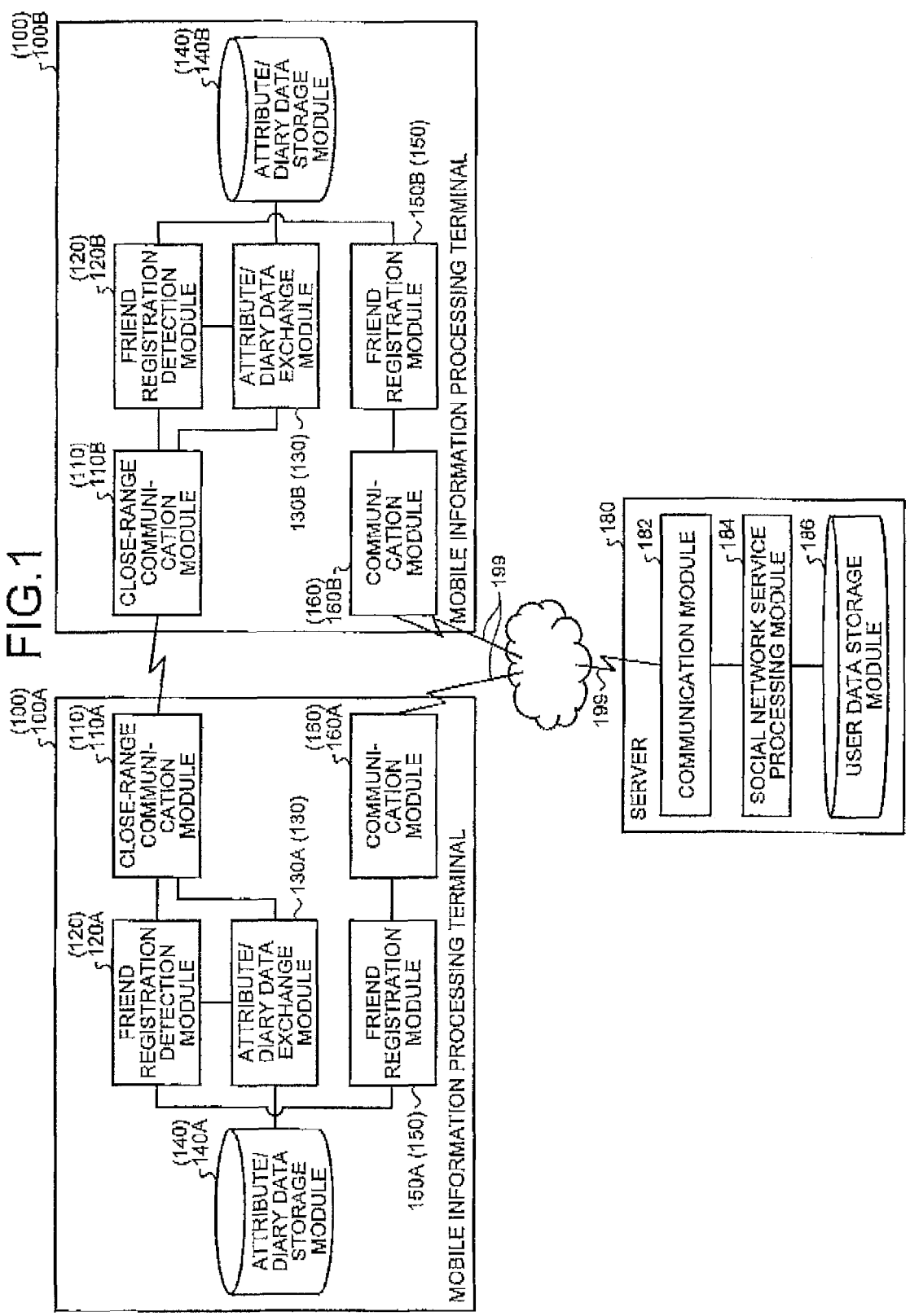
FIG. 1 is a conceptual module configuration diagram of an example of a configuration according to an embodiment.

FIG. 1 is a conceptual module configuration diagram of an example of a configuration according to the embodiment.

The "modules" here generally refer to components of software (computer programs) which can be logically separated, components of hardware, and the like. Therefore, the modules in the embodiment refer to not only modules in computer programs but also modules in hardware configurations. Accordingly, the following description of the embodiment is directed to computer programs for allowing the modules to function (a program for allowing a computer to execute each step, a program for allowing a computer to function as each means, and a program for allowing a computer to realize each function), and systems and methods for the same. For the sake of convenience, however, the terms "store," "allow . . . to store," and other similar expressions in the following description mean allowing a storage device to store, or controlling a storage device to store in the case where the embodiment is a computer.

Although modules and functions may be in a one-to-one correspondence with each other, one module may be formed by one program, or a plurality of modules may be formed by one program, or in reverse, one module may be formed by a plurality of program, in actual implementation. In addition, a plurality of modules may be executed by one computer or one module may be executed by a plurality of computers in a distributed environment or parallel environment. Further, one module may include another module.

In the following description, the term "connection" is used for physical connections and logical connections (for data exchange, instructions, reference relationships between data, and the like).

The expression "predetermined" means that something is determined prior to a target process, and indicates that, something can be described as "predetermined" even if it is determined after the process according to the embodiment starts as far as it is determined before the start of a target process, depending on the situation and the state of a target time or the situation and state so far. If a plurality of predetermined values exists, the values may be different from one another or two or more of the values (needless to say, including all of the values) may be the same.

In addition, the description "if A is satisfied, B is performed" means that "it is determined whether A is satisfied or not, and then, if it is determined that A is satisfied, B is performed." However, this does not apply if the determination on A is not needed.

The system or device may be formed by connecting a plurality of computers, hardware, devices, or the like through a communication means such as a network (including a one-to-one communication connection) or may be realized by one computer, hardware, device, or the like. The terms "device" and "system" are used as synonymous words. As a matter of course, the "system" does not include any social framework (social system) as an artificial arrangement.

When one process is performed by one module or a plurality of processes is performed by one module, target information is read for each process from a storage device, and the target information is processed, and a processing result is written into the storage device. Therefore, reading of information from the storage device before a process and writing of information into the storage device after a process may not be described below. The storage device here may include a hard disk, a RAM (random access memory) an external storage medium, a storage device connected via a communication line, a register in a CPU (central processing unit), and the like.

A social networking service system in the embodiment is intended to perform a process for friend registration in a social networking service, and has a plurality of mobile information processing terminals 100 (for example, mobile information processing terminal 100A and mobile information processing terminal 100B; in the description, when it is not necessary to distinguish between mobile information processing terminals 100A and 100B, they may be collectively referred to as "mobile information processing terminal 100") and a server 100, as illustrated in the example of FIG. 1.

The mobile information processing terminal 100A includes a close-range communication module 110A, a friend registration detection module 120A, an attribute/diary data exchange module 130A, an attribute/diary data storage module 140A, a friend registration module 150A, and a communication module 160A.

The mobile information processing terminal 100B includes a close-range communication module 110B, a friend registration detection module 120B, an attribute/diary data exchange module 130B, an attribute/diary data storage module 140B, a friend registration module 150B, and a communication module 160B. The mobile information processing terminal 100B has the functionality identical to that of the mobile information processing terminal 100A. The following description on the configuration of the mobile information processing terminal 100A also applies to the configuration of the mobile information processing terminal 100B. The mobile information processing terminal 100A and the mobile information processing terminal 100B are mobile information processing devices that are used by different users, and may be cellular phones such as smart phones, tablet PCs, game machines, or the like, for example. There is a distance between the mobile information processing terminal 100A and the mobile information processing terminal 100B that allows close-range communications. For example, when the two mobile information processing terminals 100A and 100B are brought into approximate contact with each other by overlapping together or the like, communications therebetween are enabled by the close-range communication modules 110A and 110B. In the following description, when it is not necessary to distinguish between mobile information processing terminals 100A and 100B, they may be collectively referred to as "mobile information processing terminal 100." Further the elements of the mobile information processing terminal 100 that performs same functions as the close-range communication module 110A, 110B, the friend registration detection module 120A, 120B, the attribute diary data exchange module 130A, 130B, the attribute/diary data storage module 140A, 140B, the friend registration module 150A, 150B, and the communication module 160A, 160B may be respectively referred to as a close-range communication module 110, a friend registration detection module 120, an attribute diary data exchange module 130, an attribute/diary data storage module 140, a friend registration module 150, and a communication module 160.

The mobile information processing terminal 100A, the mobile information processing terminal 100B, and the server 180 are communicably connected via a communication line 199.

The close-range communication module 110A is connected to the friend registration detection module 120A, the attribute/diary data exchange module 130A, and the close-range communication module 110B of the mobile information processing terminal 100B. The close-range communication module 110A conducts close-range communications with the other mobile information processing terminal 100B. The close-range communications may include NFC (near field communication) as international standards for wireless communications, for example.

The friend registration detection module 120A is connected to the close-range communication module 110A, the attribute/diary data exchange module 130A, and the friend registration module 150A. The friend registration detection module 120A receives by the close-range communication module 110A an application identifier for uniquely identifying an application of a social networking service (hereinafter, referred to as social application ID) used in the mobile information processing terminal 100B and a user identifier for uniquely identifying a user of the application (hereinafter, referred to as user ID). Then, the friend registration detection module 120A determines whether the application ID matches the application ID of the social networking service used in the mobile information processing terminal 100A. As a course of matter, the mobile information processing terminal 100B transmits the social application ID and the user ID to the mobile information processing terminal 100A capable of close-range communications.

The attribute/diary data exchange module 130A is connected to the close-range communication module 110A, the friend registration detection module 120A, and the attribute/diary data storage module 140A. The attribute/diary data exchange module 130A receives through the close-range communication module 110A the attributes of the user with the user ID received from the mobile information processing terminal 100B. Then, the attribute/diary data exchange module 130A extracts data related to the attributes from the data stored in the attribute/diary data storage module 140A within the mobile information processing terminal 100A.

The attribute/diary data storage module 140A is connected to the attribute/diary data exchange module 130A. The attribute/diary data storage module 140A stores the attributes (name, sex, age, address, hobby, interest, and the like) of the user of the mobile information processing terminal 100A (also the user of the application of the social networking service), information related to the user (a diary (including a blog and the like) written using the application of the social networking service, photographs, text, and the like). For example, diary and others stored in the server 180 may be downloaded in advance into the attribute/diary data storage module 140A.

The friend registration module 150A is connected to the friend registration detection module 120A and the communication module 160A. If the friend registration detection module 120A determines that there is a match between the application IDs, the friend registration module 150A transmits the user ID received from the mobile information processing terminal 100B to the server 180 of the social networking service via the communication module 160A so that the user with the user ID is stored as a friend. As described above, the sane process is performed at the mobile information processing terminal 100B, and thus each of the mobile information processing terminal 100A and the mobile information processing terminal 100B independently registers the user with the user ID received from the other mobile information processing terminal 100 as a friend in the server 180 of the social networking service. The expression "independently" here refers to regardless of the other mobile information processing terminal 100, and the timing of transmission may be decided depending on mutual convenience. Therefore, even if one of the mobile information processing terminals 100 cannot transmit the user ID due to a communication fault or the like, it is possible to build a friendship in the social networking service as far as the other mobile information processing terminal 100 transmits the user ID.

The communication module 160A is connected to the friend registration module 150A, and is also connected to the communication module 160B of the mobile information processing terminal 100B and a communication module 182 of the server 180 via the communication line 199. The communication module 160A is a communication means capable of being network-connected to the Internet or the like.

The server 180 includes the communication module 182, a social network service processing module 184, and a user data storage module 186. The server 180 provides a social networking service to the mobile information processing terminal 100A and the mobile information processing terminal 100B.

The communication module 182 is connected to the social network service processing module 184, and is also connected via the communication line 199 to the communication module 160A of the mobile information processing terminal 100A and the communication module 160B of the mobile information processing terminal 100B. The communication module 182 is a communication means capable of being network-connected to the Internet or the like.

The social network service processing module 184 is connected to the communication module 182 and the user data storage module 186. The social network service processing module 184 receives the user IDs to be registered as friends transmitted from the mobile information processing terminal 100A and the mobile information processing terminal 100B. Then, the social network service processing module 184 registers the users with the user IDs as friends of the users of the mobile information processing terminals 100 having transmitted the user IDs.

The user data storage module 186 is connected to the social network service processing module 184. The user data storage module 186 stores data necessary for the social networking service. For example, the user data storage module 186 stores the user IDs of users using the social networking service, friend information indicative of correspondence between the user IDs of the users as friends, diaries of the users and the like, and others.

Figure 2:
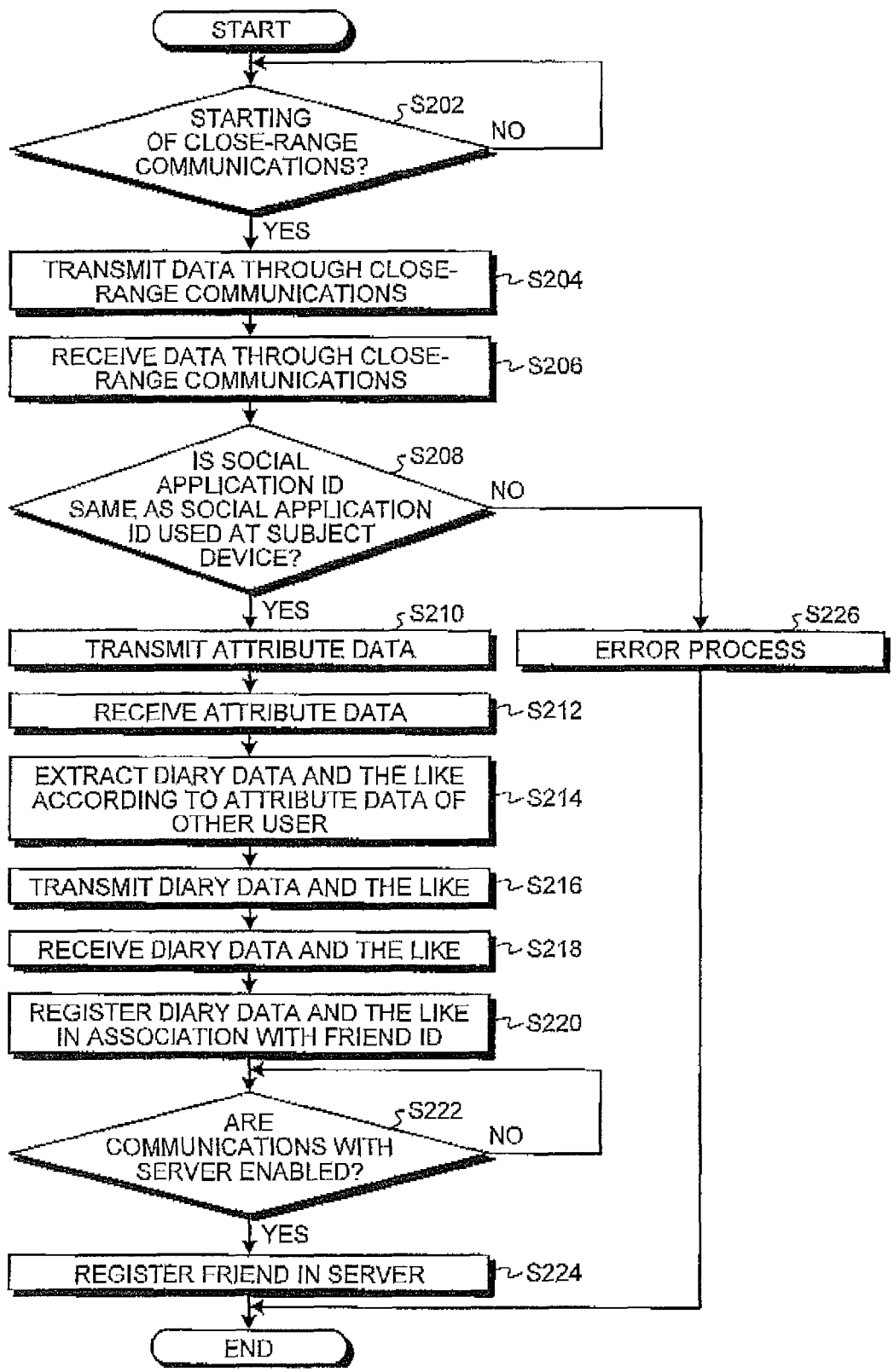
FIG. 2 is a flowchart of an example of a process according to the embodiment (mobile information processing terminal)

FIG. 2 is a flowchart of an example of a process according to the embodiment (the mobile information processing terminal 100A and the mobile information processing terminal 100B).

At step S202, the close-range communication module 110 determines whether close-range communications are to be started. If determining that close-range communications are to be started, the close-range communication module. 110 moves to step S204, and if not thus determining, the close-range communication module 110 waits until close-range communications are started. For example, close-range communications may be started by approximately contacting the mobile information processing terminal 100A and the mobile information processing terminal 100B. The approximate contact is made if the users of the mobile information processing terminal 100A and the mobile information processing terminal 100B wish to begin a friendship with each other or the like. That is, the approximate contact is an action for the users actually meeting each other to form a friendship relation in the social networking service without having to conduct search using the server 180.

Figure 4:
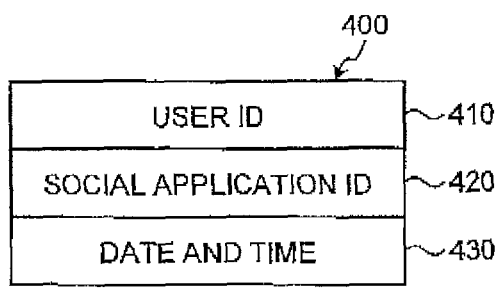
FIG. 4 is an illustrative diagram of an example of a data structure in a friend registration data table.

At step S204, the friend registration detection module 120 transmits data through close-range communications. For example, the friend registration detection module 120 transmits a friend registration data table 400. FIG. 4 is an illustrative diagram of an example of a data structure in the friend registration data table 400. The friend registration data table 400 includes a user ID column 410, a social application ID column 420, and a date and time column 430.

The user ID column 410 stores the user ID of the user as a transmitter. The user ID may be a user ID under the condition that the user as a transmitter has logged in the mobile information processing terminal. Detailed description will be given below. Before using the social networking service, it is necessary to log in to the mobile information processing terminal (receive an approval). After that, the application of the social networking service is started and the social networking service is logged in (in general, automatically logged in). The login here refers to a login to the mobile information processing terminal. Therefore, the mobile information processing terminal is not in the sleep state (the screen is not turned off). In general, even when the mobile information processing terminal is in the sleep state, the application is activated in the background to conduct communications or the like. Therefore, if the foregoing condition is not imposed in the embodiment, it is possible to make a friend registration simply by bringing the mobile information processing terminals in the sleep state close to each other. This may take place even when the users have no will to make a friend registration. Accordingly, a friend registration is enabled only when the users use the mobile information processing terminals, so that the friend registration is possible only when both of the users have clear intention to make a friend registration, that is, only after a login is performed to the mobile information processing terminals.

The social application ID column 420 stores the social application ID. For example, the social application ID may be a social application ID of an application currently running on the mobile information processing terminal 100. Alternatively, the social application ID may be a social application ID by which the user currently log in to the social networking service.

The date and time column 430 stores the transmission date and time (year, month, date, second, sub-second, or combinations of the foregoing items. This also applies to the following descriptions). When in approximate contact with each other, both of the mobile information processing terminal 100A and the mobile information processing terminal 100B transmit data of date and time.

At step S206, the friend registration detection module 120 receives data through close-range communications. The friend registration detection module 120 receives the friend registration data table 400 transmitted from the other mobile information processing terminal 100.

At step S208, the friend registration detection module 120 determines whether the received social application ID is the same as the social application ID used at the subject device. If the social application IDs are the same, the friend registration detection module 120 moves to step S210, and in the case other than the foregoing one, the friend registration detection module 120 moves to step S226, the friend registration detection module 120 determines whether there is a match between the social application ID currently running on the mobile information processing terminal 100 and the social application ID in the social application ID column 420 of the received friend registration data table 400. Alternatively, the friend registration detection module 120 may determine whether there is a match between the contents of the social application ID column 420 of the transmitted friend registration data table 400 and the contents of the social application ID column 420 of the received friend registration data table 400.

Figure 5:
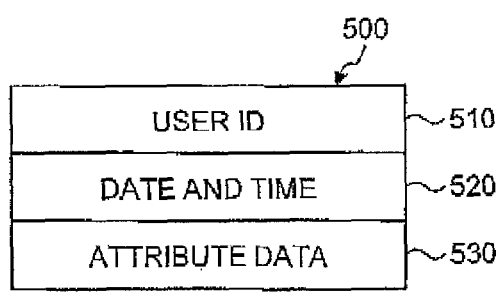
FIG. 5 is an illustrative diagram of an example of a data structure in an attribute data table.

At step S210, the attribute/diary data exchange module 130 transmits the attribute data. The attribute/diary data exchange module 130 extracts the attribute data of the user of the mobile information processing terminal 100 from the attribute/diary data storage module 140 and transmits the same. For example, the attribute/diary data exchange module 130 transmits an attribute data table 500. FIG. 5 is an illustrative diagram of an example of a data structure of the attribute data table 500. The attribute data table 500 has a user ID column 510, a date and time column 520, and an attribute data column 530. The user ID column 510 stores the user ID of the user as a transmitter. The date and time column 520 stores the transmission date and time. The attribute data column 530 stores the attribute data of the user ID.

At step S212, the attribute/diary data exchange module 130 receives the attribute data. The attribute/diary data exchange module 130 receives the attribute data table 500 transmitted from the other mobile information processing terminal 100.

At step S214, the attribute/diary data exchange module 130 extracts diary data and the like according to the attribute data of the other user from the attribute/diary data storage module 140. If the attribute data includes the name, the attribute/diary data exchange module 130 extracts the diary or the like with the name from the attribute/diary data storage module 140. In addition, if the attribute data includes a hobby and an interest, the attribute/diary data exchange module 130 extracts the diary or the like with the hobby, interest, or any words related to them from the attribute/diary data storage module 140. The attribute/diary data exchange module 130 may extract such related words through a search of a prepared related word dictionary or the like, for example.

Figure 6:
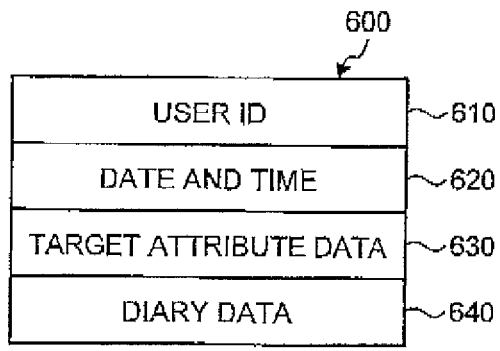
FIG. 6 is an illustrative diagram of an example of a data structure in a diary data table.

At step S216, the attribute/diary data exchange module 130 transmits the diary data or the like extracted at step S214. For example, the attribute/diary data exchange module 130 transmits a diary data table 600. FIG. 6 is an illustrative diagram of an example of a data structure of the diary data table 600. The diary data table 600 includes a user ID column 610, a date and time column 620, a target attribute data column 630, and a diary data column 640. The user ID column 610 stores the user ID of the user as a transmitter. The date and time column 620 stores the transmission date and time. The target attribute data column 630 stores the attributes searched at step S214. The diary data column 640 stores the results of the search (diary or the like) by the attributes.

At step S218, the attribute/diary data exchange module 130 receives the diary data or the like. The diary data table 600 transmitted from other mobile information processing terminal 100 is received.

At step S220, the attribute/diary data exchange module 130 registers the transmitted diary data or the like in association with the friend ID (the user ID of the other user) in the attribute/diary data storage module 140. Then, the diary data or the like may be displayed on a display of the mobile information processing terminal 100. Accordingly, the user allows the new friend to read his/her diary or the like and articles related to his/her hobby, interest, and the like. This triggers communications between them and promotes closeness between them.

At step S222, the communication module 160 determines whether communications with the server 18D are enabled. If communications are enabled, the communication module 160 moves to step S224, and in the case other than the foregoing one, the communication module 160 waits until communications become enabled. For example, the communication module 160 determines whether, in a mobile communication service, radio waves from a base station can be received. The user of the mobile information processing terminal 100 (one or both of the mobile information processing terminals 100) capable of communication with the server 180 makes a friend registration at step S224. In addition, if communications with the server 180 are first not enabled but become enabled afterward, the friend registration at step S224 is made at that time.

Figure 7:
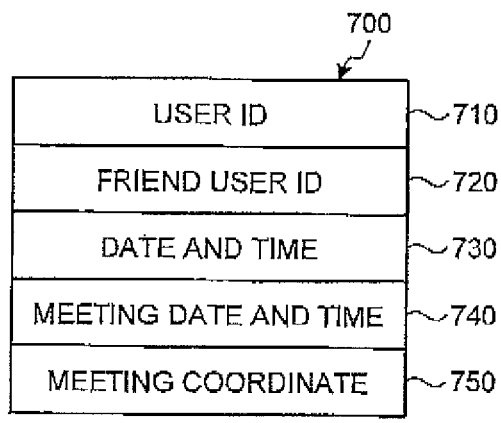
FIG. 7 is an illustrative diagram of an example of a data structure in a friendship registration data table.

At step S224, the friend registration module 150 makes a friend registration in the server 180. That is the friend registration module 150 registers the user with the user ID received at step S204 as a friend in the social networking service. For example, the friend registration module 150 transmits a friend registration data table 700 for the registration. FIG. 7 is an illustrative diagram of an example of a data structure of the friend registration data table 700. The friend registration data table 700 includes a user ID column 710, a friend user ID column 720, a date and time column 730, a meeting date and time column 740, and a meeting coordinate column 750. The user ID column 710 stores the user ID of the user as a transmitter. The friend user ID column 720 stores the user ID of the user to be registered as a friend of the transmitter. The date and time column 730 stores the transmission date and time. The meeting date and time column 740 stores the date and time when the mobile information processing terminal 100A and the mobile information processing terminal 100B are brought into approximate contact with each other. The meeting coordinate column 750 stores the coordinates (using GPS) at which the mobile information processing terminal 100A and the mobile information processing terminal 100B are brought into approximate contact with each other.

At step S226, if one of the social application IDs does not exist or the social application IDs are different, an error process is performed. For example, a message to notify that the corresponding application of the social networking service does not operate may appear on the display. If the application corresponding to the social application ID of the other user is stored in the mobile information processing terminal 100, the application may be started. In addition, if the application corresponding to the social application ID of the other user is not stored in the mobile information processing terminal 100, a request for a URL (uniform resource locator) from which the application can be downloaded may be made to the mobile information processing terminal 100 of the other user so that the URL is returned from the mobile information processing terminal 100 of the other user to prompt the user to download the application. If a different social application ID exists, both of the mobile information processing terminals 100 may transmit their enrollment periods of the social networking services to each other so that the enrollment periods are compared and the mobile information processing terminal 100 with the shorter enrollment period downloads the application of the social networking service in which the mobile information processing terminal 100 with the longer enrollment period enrolls.

The mobile information processing terminals 100 perform close-range communications until step S220.

Figure 3:
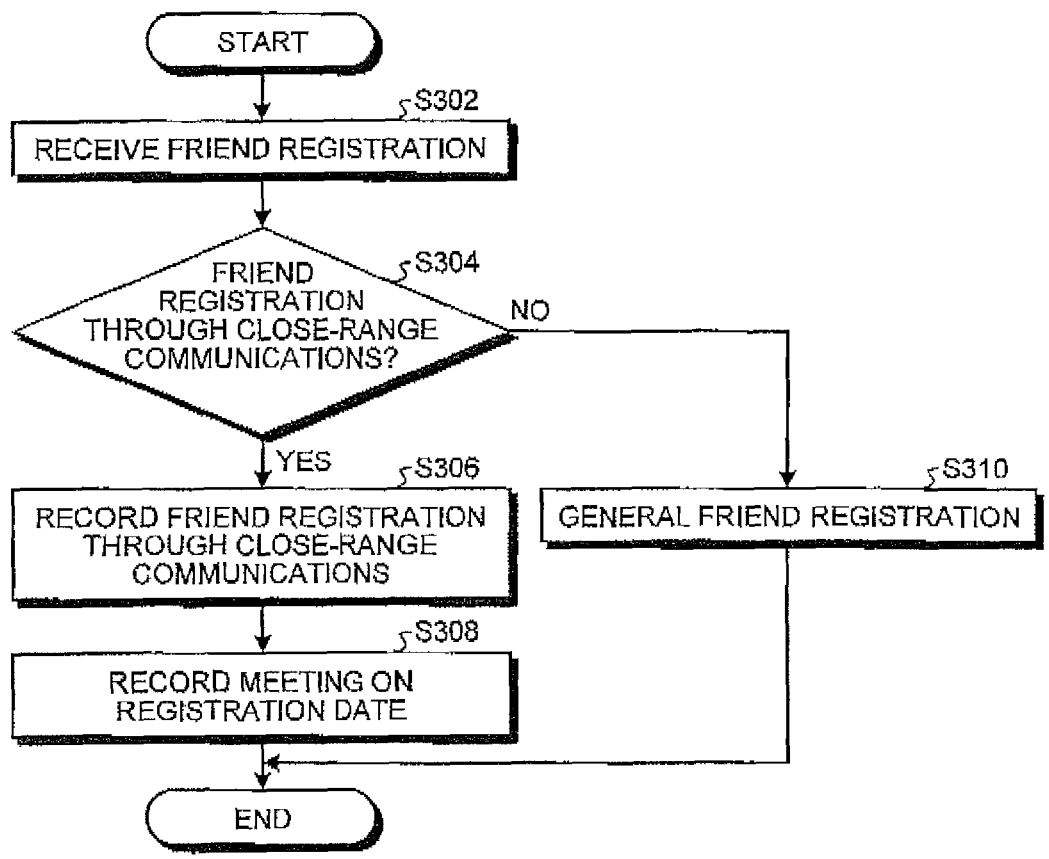
FIG. 3 is a flowchart of an example of a process according to the embodiment (server)

FIG. 3 is a flowchart of an example of a process by the embodiment (server 180). The process is performed after step S224 in the flowchart of the example illustrated in FIG. 2.

At step S302, the communication module 182 receives the friend registration.

At step S304, the social network service processing module 184 determines whether the friend registration is made through close-range communications. If the friend registration is made through close-range communications, the social network service processing module 184 moves to step S306, and in the case other than the foregoing one, the social network service processing module 184 moves to step S310. For example, if the meeting coordinate column 750 of the friend registration data table 700 includes any data, the social network service processing module 184 may determines that the friend registration is made through close-range communications.

At step S306, the social network service processing module 184 records the friend registration through close-range communications in the user data storage module 186, the social network service processing module 184 records data indicating that the friend registration is not a general friend registration (not the conventional friend registration through a request and an approval) but the users have actually met each other and become friends and the process represented in FIG. 2 is performed.

At step S308, the social network service processing module 184 records that the users met on the registration date in the user data storage module 186. That is, in the social networking service managing the actual meeting date and time, the registration date and time are managed as the actual meeting date and time.

At step S310, a general friend registration is made.

Figure 8:
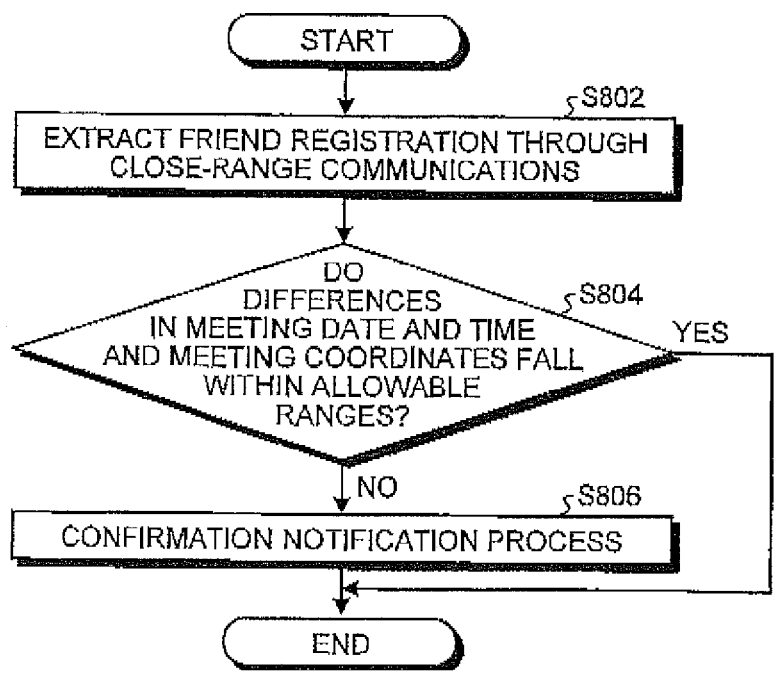
FIG. 8 is a flowchart of an example of a process according to the embodiment (server)

FIG. 8 is a flowchart of an example of a process by the embodiment (server 180). In the process of the flowchart of the example illustrated in FIG. 3, a friend registration is made without a request and an approval, and thus a further strict process as illustrated in FIG. 8 may be performed.

At step S802, the friend registration through close-range communications is extracted.

At step S804, the server 180 determines whether differences in the meeting date and time and the meeting coordinates fall within allowable ranges. If the differences fall within the allowable ranges, the server 180 terminates the process, and in the case other than the foregoing one, the server 180 moves to step S805. The allowable ranges here refer to error ranges performed in the mobile information processing terminal 100.

At step S806, the server 180 performs a confirmation notification process. The server 180 transmits to both of the mobile information processing terminals 100 a message to notify that the friend registration is made and ask for a confirmation whether the friend registration is to be continued.

The social application ID column 420 in the friend registration data table 400 may store the names of social networking services (including information for uniquely identifying the social networking services. This also applies to the following descriptions) available on the mobile information processing terminal (100A, 100B) or the names of applications for the social networking services. That is, the social application ID column 420 needs to store information to make it possible to confirm that the users are enrolled in the same social networking service. In this case, at step S208 described above, the friend registration detection module 120 determines whether the users of the devices have in common the name of the used social networking service or the name of the application for the used social networking service. If the users have the name in common, the friend registration detection module 120 moves to step S210, or in the case other than the foregoing, the friend registration detection module 120 moves to step S226.

In the foregoing example, the two mobile information processing terminals 100 are used. Alternatively, three or more mobile information terminals may be used. In this case, a plurality of user IDs are registered as friends.

Figure 9:
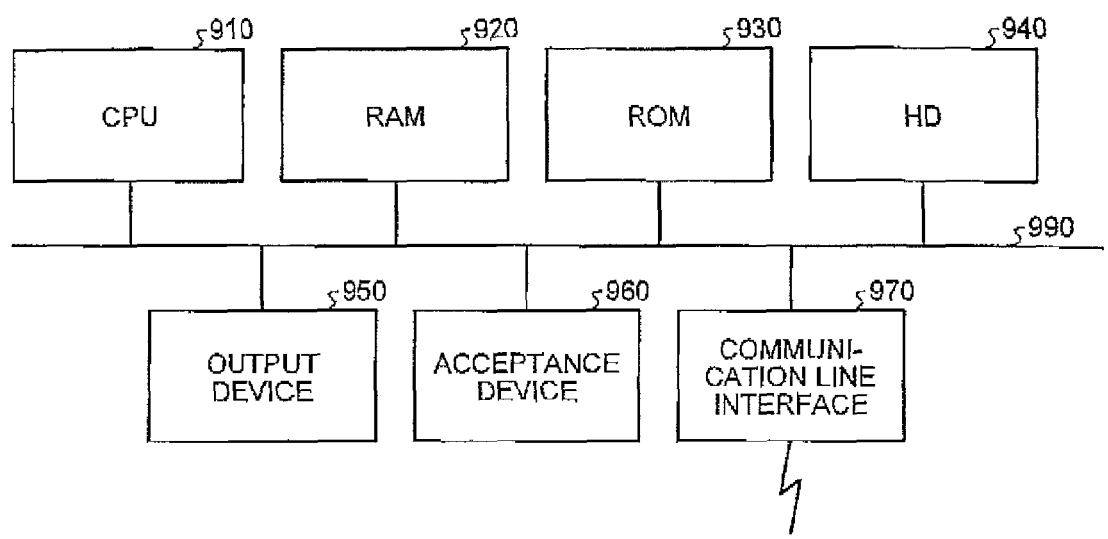
FIG. 9 is a block diagram of an example of a hardware configuration in a computer realizing the embodiment.

A hardware configuration of the computer (mobile information processing terminal 100 and server 180) on which programs are executed in the embodiment is the same as that of a general computer as illustrated in FIG. 9. Specifically, the computer can also serve as a server that executes many processes other than the processes in the embodiment. The computer includes: a CPU 910 executing programs such as the friend registration detection module 120, the attribute/diary data exchange module 130, the friend registration module 150, and the social network service processing module 184; a RAM 920 storing the programs and data; a ROM 930 storing programs and others for starting the computer; an HD 940 and the like as an auxiliary storage device; an output device 950 outputting data to a display device such as a liquid crystal display or a printing device; an acceptance device 960 to which data is entered by an operator's operation from a keyboard, mouse, touch panel, or the like; a communication line interface 970 for connection with communication networks (including close-range communication networks such as NFC in the case of the mobile information processing terminal 100); and a bus 990 connecting the foregoing components for data exchange. A plurality of computers may be connected together via a network.

The programs described above may be stored and provided in recording media, or may be provided by communication means. In this case, for example, the foregoing programs may be considered as an invention of "computer-readable recording media recording programs."

The "computer-readable recording media recording programs" refer to recording media capable of being read by computers recording programs, which are used for installation, execution, distribution, or the like of the programs.

For example, the recording media include: digital versatile discs (DVD) such as DVD-R, DVD-RW, and DVD-RAM that are standards formulated by the DVD forum, and DVD+R and DVD+RW that are standards formulated by DVD+RW; compact discs (CDs) such as read-only memory (CD-ROM), CD recordable (CD-R), and CD rewritable (CD-RW); Blu-Ray discs (registered trademark); optical magnetic discs (MO); flexible discs (FD); magnetic tapes; hard discs; read-only memories (ROM); electrically erasable and rewritable read-only memories (EEPROM (registered trademark)); flash memories; random access memories (RAM); SD (secure digital) memory cards; and the like.

The foregoing programs or portions of the same may be recorded, saved, distributed, or the like in the foregoing recording media. In addition, the programs or portions of the same may be transmitted through telecommunications, for example, wired networks or wires communication networks for use in local area networks (LAN), metropolitan area networks (MAN), wide area networks (WAN), the Internet, the Intranet, an extra networks or the like, or transmission media with a combination of the foregoing networks, or may be transferred on carrier waves.

Further, the foregoing programs may be portions of other programs or may be recorded together with other programs in recording media. In addition, the foregoing programs may be divided and recorded in a plurality of recording media. Moreover, the foregoing programs may be recorded in any mode as far as the programs can be compressed or encrypted and then recovered.

According to a mobile information processing terminal, a social networking service system, a server, a processing method, and a program according to an embodiment, each user in a social networking service can easily register a person whom the user is actually meeting with as a friend using each other's mobile information processing terminals, without having to conduct a search using the server.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile information processing terminal, comprising:
a close-range communication unit configured to perform close-range communications with another mobile information processing terminal; and
a processor operatively coupled with the close-range communication unit, the processor being programmed to:
determine whether the close-range communications with the other mobile information processing terminal are to be started;
in response to determining that the close-range communications are to be started, receive through the close-range communication unit a first user identifier for uniquely identifying a user of an application for a social networking service on the other mobile information processing terminal;
in response to determining that the close-range communications are to be started, receive through the close-range communication unit a first application identifier for uniquely identifying the application for the social networking service on the other mobile information processing terminal;
determine whether there is a match between the first application identifier and a second application identifier of a social networking service on the mobile information processing terminal; and
when it is determined that there is the match, transmit the received first user identifier, a second user identifier, and information on the close-range communications to a server of the social networking service so as to automatically register the user identified by the received first user identifier as a friend when the information on the close-range communications indicates that the two mobile information processing terminals have performed close-range communications with each other, without the server having to perform an operation of transmitting a friend request to the user identified by the received first user identifier, the second user identifier uniquely identifying a user of an application for the social networking service on the mobile information processing terminal, the information on the close-range communications including coordinates at which the two mobile information processing terminals are brought into approximate contact with each other.

2. The mobile information processing terminal according to claim 1, wherein the processor is programmed to:
receive through the close-range communication unit an attribute of the user identified by the first user identifier received from the other mobile information processing terminal;
extract data related to the attribute from data stored in the mobile information processing terminal; and
transmit through the close-range communication unit the data extracted by the extraction unit to the other mobile information processing terminal.

3. The mobile information processing terminal according to claim 1, wherein:
the processor is programmed to transmit the second user identifier through the close-range communication unit;
the other mobile information processing terminal has a processor programmed with a same transmission function as the processor of the mobile information processing terminal; and
the processor of the mobile information processing terminal and the processor of the other mobile information processing terminal independently transmit the received user identifiers to the server of the social networking service so as to register the users identified by the respective user identifiers as a friend.

4. The mobile information processing terminal according to claim 1, wherein the processor is programmed to:
when the user logs in on the mobile information processing terminal, transmit through the close-range communication unit the user identifier of the user who logs in, to the other mobile information processing terminal.

5. The mobile information processing terminal according to claim 1, wherein the information on the close-range communications includes a time when the two mobile information processing terminals are brought into approximate contact with each other.

6. A social networking service system comprising
a mobile information processing terminal and a server are communicably connected with each other, wherein:
the mobile information processing terminal comprises:
a close-range communication unit configured to perform close-range communications with another mobile information processing terminal; and
a processor operatively coupled with the close-range communication unit, the processor being programmed to:
determine whether the close-range communications with the other mobile information processing terminal are to be started;
in response to determining that the close-range communications are to be started, receive through the close-range communication unit a first user identifier for uniquely identifying a user of an application for a social networking service on the other mobile information processing terminal;
in response to determining that the close-range communications are to be started, receive through the close-range communication unit a first application identifier for uniquely identifying the application for the social networking, service on the other mobile information processing terminal;
determine whether there is a match between the first application identifier and a second application identifier of a social networking service on the mobile information processing terminal; and
when it is determined that there is the match, transmit the received first user identifier, a second user identifier, and information on the close-range communications to a server of the social networking service so as to automatically register the user identified by the received first user identifier as a friend when the information on the close-range communications indicates that the two mobile information processing terminals have performed close-range communications with each other, without the server having to perform an operation of transmitting a friend request to the user identified by the received first user identifier, the second user identifier uniquely identifying a user of an application for the social networking service on the mobile information processing terminal, the information on the close-range communications including coordinates at which the two mobile information processing terminals are brought into approximate contact with each other; and the server comprises:
a network interface that receives the first user identifier of the user to be registered as a friend transmitted from the mobile information processing terminal, the second user identifier, and the information on the close-range communications; and a processor programmed to automatically register the user identified by the received first user identifier as the friend of the user of the mobile information processing terminal when the information on the close-range communications indicates that the two mobile information processing terminals have performed close-range communications with each other without having to perform an operation of transmitting a friend request to the user identified by the received first user identifier and without having received any signal indicating that the user identified by the first user identifier accepted a friend request sent by the user of the mobile information processing terminal.

7. A processing method performed by a mobile information processing terminal including a close-range communication unit that performs close-range communications with another mobile information processing terminal, and processor operatively coupled with the close-range communication unit, the method comprising:

determining, by the processor, whether the close-range communications with the other mobile information processing terminal are to be started;

in response to determining that the close-range communications are to be started, receiving, by the close-range communication unit, a first user identifier for uniquely identifying a user of an application for a social networking service on the other mobile information processing terminal;

in response to determining that the close-range communications are to be started, receiving through the close-range communication unit a first application identifier for uniquely identifying the application for the social networking service on the other mobile information processing terminal;

determining, by the processor, whether there is a match between the first application identifier and a second application identifier of a social networking service on the mobile information processing terminal; and transmitting, by the processor, when it is determined that there is the match, the received first user identifier, a second user identifier, and information on the close-range communications to a server of the social networking service so as to automatically register the user identified by the received first user identifier as a friend when the information on the close-range communications indicates that the two mobile information processing terminals have performed close-range communications with each other, without the server having to perform an operation of transmitting a friend request to the user identified by the received first user identifier, the second user identifier uniquely identifying a user of an application for the social networking service on the mobile information processing terminal, the information on the close-range communications including coordinates at which the two mobile information processing terminals are brought into approximate contact with each other.

8. A non-transitory computer readable storage medium having stored therein a program for causing a computer to perform the following functions:

determining whether the close-range communications with the other mobile information processing terminal are to be started;

in response to determining that the close-range communications are to be started, receiving through a close-range communication unit, a first user identifier for uniquely identifying a user of an application for a social networking service on the other mobile information processing terminal;

in response to determining that the Close-range communications are to be started, receiving through the close-range communication unit a first application identifier for uniquely identifying the application for the social networking service on the other mobile information processing terminal;

determining whether there is a match between the first application identifier and a second application identifier of a social networking service on the mobile information processing terminal; and transmitting, when it is determined that there is the match, the received first user identifier, a second user identifier, and information on the close-range communications to a server of the social networking service so as to automatically register the user identified by the received first user identifier as a friend when the information on the close-range communications indicates that the two mobile information processing terminals have performed close-range communications with each other, without the server having to perform an operation of transmitting a friend request to the user identified by the received first user identifier, the second user identifier uniquely identifying a user of an application for the social networking service on the mobile information processing terminal, the information on the close-range communications including coordinates at which the two mobile information processing terminals are brought into approximate contact with each other.

* * * * *